United States Patent [19]

Rolf et al.

[11] Patent Number: 5,597,028
[45] Date of Patent: Jan. 28, 1997

[54] FABRIC DEVICE FOR COVERING VEHICLE OPENING

[76] Inventors: Devon A. Rolf; Rebecca L. Rolf, both of 4428 NW. Briarcliff La., Gladstone, Clay County, Mo. 64116; Leland L. Wong, 9831 N. Holmes, Kansas City, Clay County, Mo. 64118

[21] Appl. No.: 277,326

[22] Filed: Jul. 19, 1994

[51] Int. Cl.$^6$ ............................................. A47H 23/00
[52] U.S. Cl. ....................................... 160/354; 160/368.1
[58] Field of Search ................................ 160/327, 328, 160/329, 354, 368.1, 370.22, 370.21, 270, 271, 272, 273.1; 296/24.1, 50, 138

[56] References Cited

U.S. PATENT DOCUMENTS

| | | | |
|---|---|---|---|
| 1,605,056 | 11/1926 | Newman | 160/354 |
| 2,501,454 | 3/1950 | Schueren | 160/273.1 |
| 2,717,036 | 9/1955 | Harris | 160/354 |
| 2,979,129 | 4/1961 | Ketchum | 160/370.21 |
| 3,004,592 | 10/1961 | Norton | 160/368.1 |
| 3,768,540 | 10/1973 | McSwain | 160/271 X |
| 3,805,872 | 4/1974 | Lorber | 160/354 |
| 4,100,957 | 7/1978 | Shelton | 160/368.1 |
| 4,220,298 | 9/1980 | Willis | 160/354 |
| 4,221,256 | 9/1980 | Karaki | 160/368.1 |
| 4,862,943 | 9/1989 | Shafia | 160/370.21 |
| 5,016,937 | 5/1991 | White | 160/370.21 |
| 5,323,835 | 6/1994 | Bachmeier | 160/354 |
| 5,344,206 | 9/1994 | Middleton | 160/271 |
| 5,368,085 | 11/1994 | Ruparelia | 160/327 |
| 5,382,068 | 1/1995 | Simmons et al. | 160/327 |
| 5,427,169 | 6/1995 | Saulters | 160/368.1 |

*Primary Examiner*—David M. Purol
*Attorney, Agent, or Firm*—Kokjer, Kircher, Bowman & Johnson

[57] ABSTRACT

An article has a sheet of material dimensioned to cover the opening to the cargo area of a vehicle. The sheet is adapted for releasable engagement about the periphery of the cargo opening. The sheet is made of screen or other mesh-like material. Various fasteners, such as a zipper, velcro, adhesive, snaps, clasps, and the like. In one embodiment, an elastomeric cord looped through the outer periphery of the sheet is adapted to stretch into place about a rubber gasket located about the periphery of the cargo opening. In a similar embodiment, an elastic band is used in such a manner. In another embodiment, a draw string is provided at the periphery of the sheet for drawing the sheet tightly about the rubber gasket on the vehicle. Preferably, a wide band of stretchable material, such as elastic or Spandex® is positioned between the mesh sheet and the outer periphery to permit the article, when in place, to yield to certain forces without becoming unattached from the vehicle. A zipper may be provided to permit ingress\egress from the vehicle. In another embodiment, the sheet is in a roll positioned along an edge of the cargo opening. The sheet may be unrolled to cover the cargo opening or rolled up for storage. During rolling and unrolling, edges of the sheet are guided by rails about the periphery of the cargo opening and are preferably lined with elastomeric or stretchable material to follow contours in the periphery of the cargo opening.

20 Claims, 3 Drawing Sheets

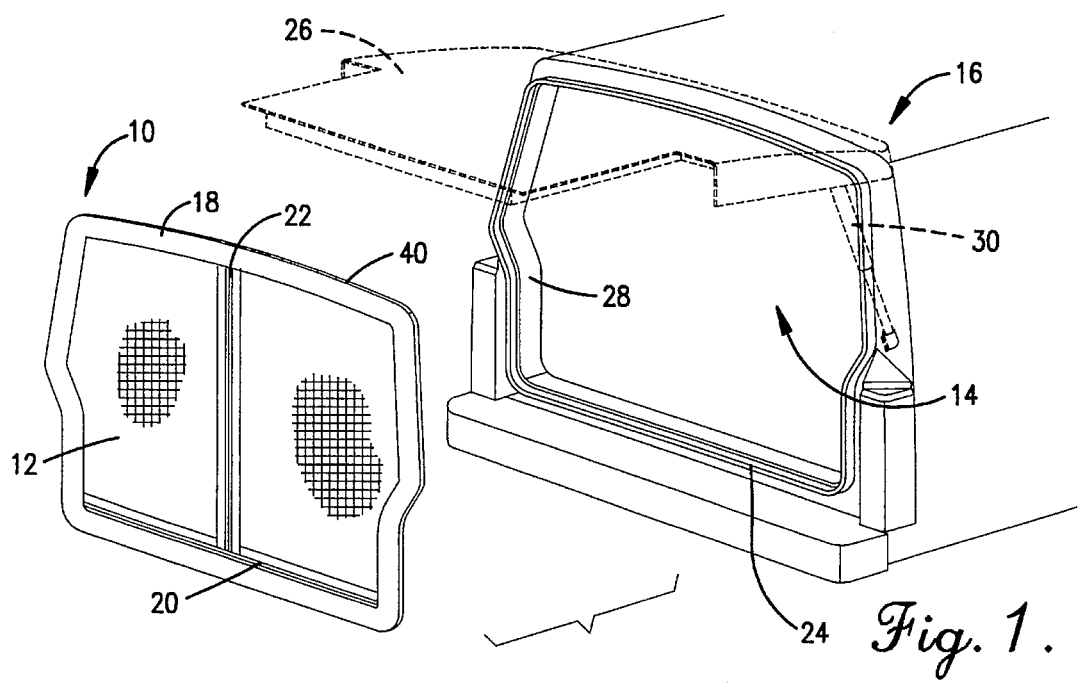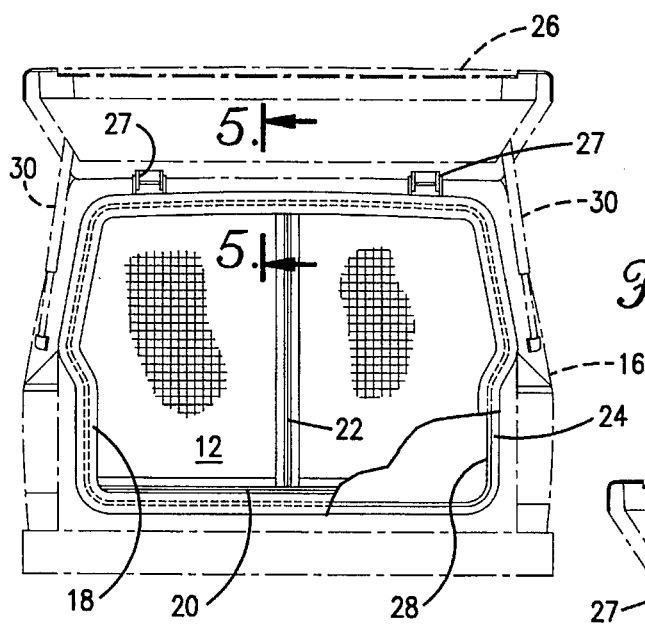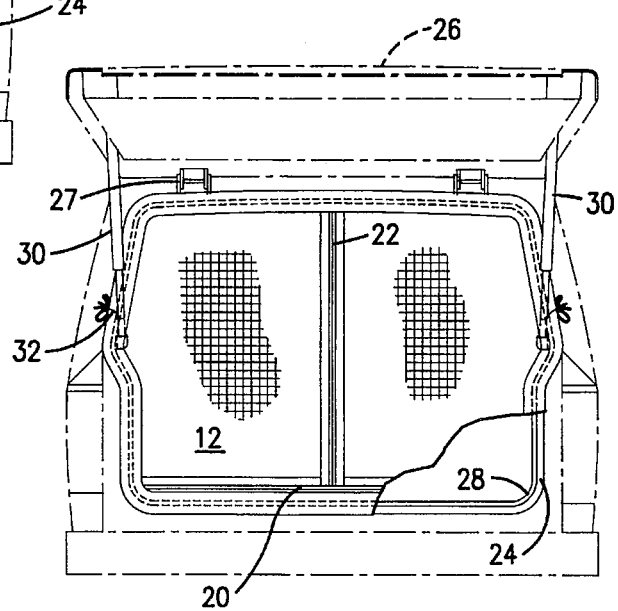

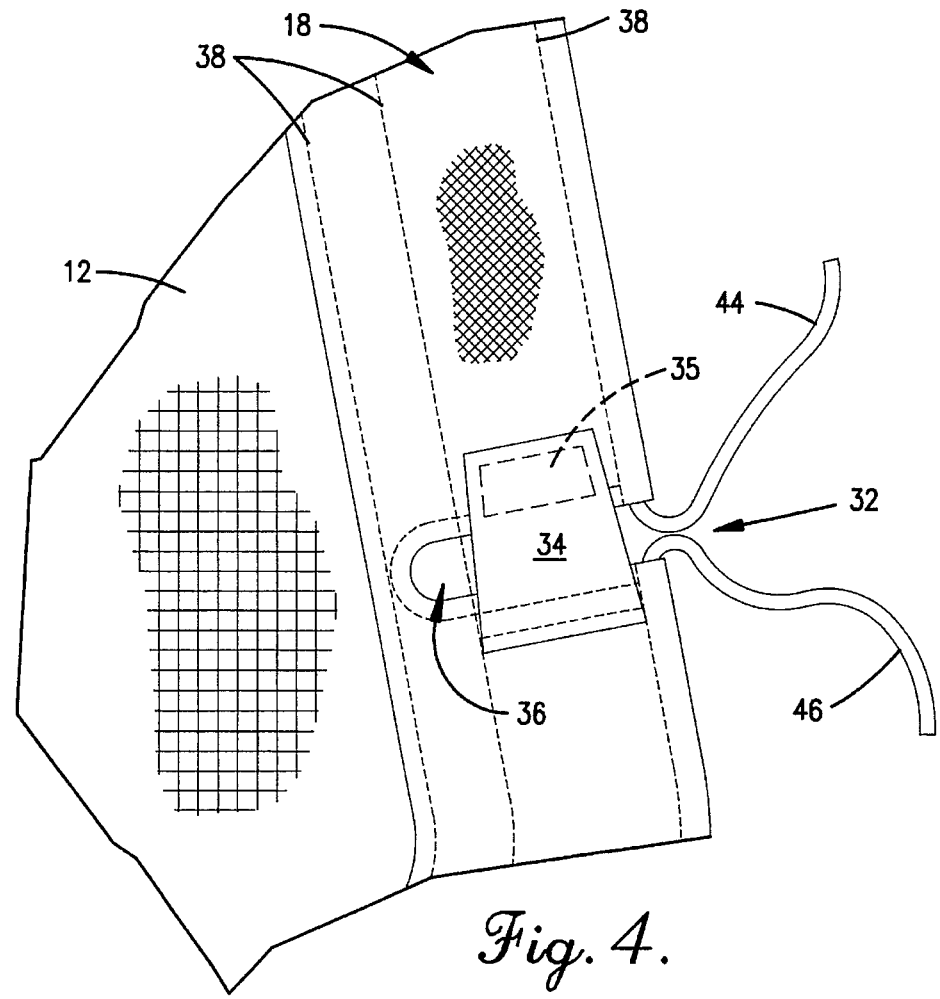
Fig. 4.
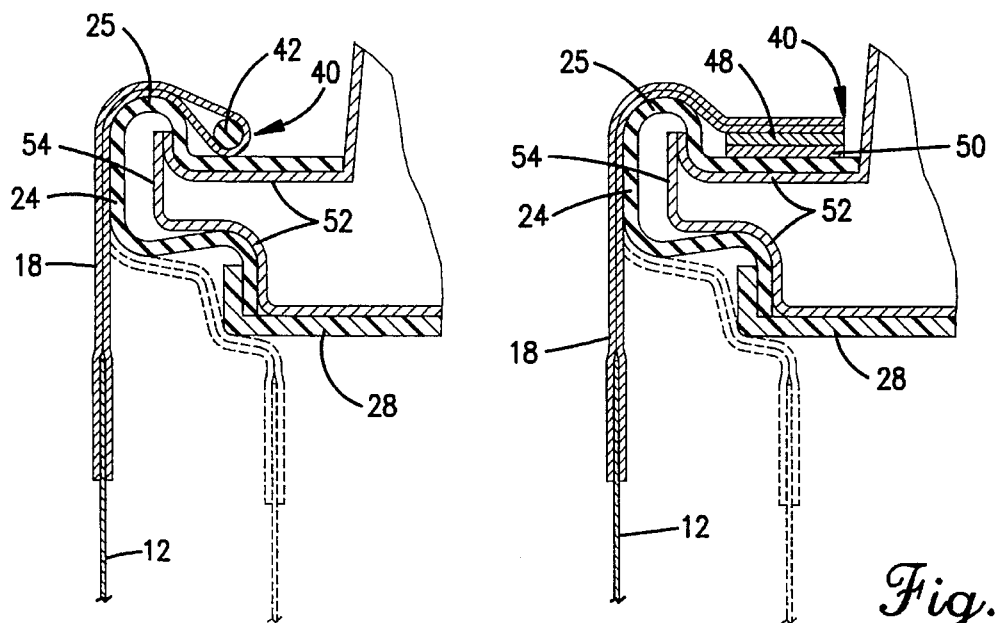
Fig. 5.
Fig. 6.

FABRIC DEVICE FOR COVERING VEHICLE OPENING

BACKGROUND OF THE INVENTION

1. Field of the Invention

The present invention is generally directed to a panel of material for covering the opening of a cargo area of a vehicle. More specifically, the present invention is directed to an enclosure made of a mesh, screen, or net-like material, such as is typically used in tent door panels, for covering the opening of the cargo area of a vehicle, such as a utility vehicle, a station wagon, a van, or a minivan, for instance.

2. Description of the Related Art

Sport utility vehicles and minivans have become increasingly popular in recent years. These vehicles are especially useful and desired because of their versatility. Particularly, the open cargo area towards the rear of these vehicles are highly useful for a wide variety of purposes.

One of the particular advantages of sport utility vehicles, minivans, full-size vans, and station wagons are their usefulness for recreational purposes. For instance, these types of vehicles are highly useful for vacationing, for going on picnics, and for camping. Many times, the cargo area of vehicles of this type are used on such vacations or camping trips, or merely at a rest stop on a long voyage, as a place to lie down, stretch, or simply relax. Furthermore, these cargo areas are known to be used on camping trips as a place for sleeping. Additionally, the cargo area of such vehicles are often used as a place to set out food-stuffs, such as for instance, on a camping trip or at a picnic. Such uses have resulted in the development of a number of tent-like structures for attaching onto a parked vehicle at its cargo door. However, these devices tend to be large and bulky when not in use and cumbersome and time consuming to erect and take down.

Additionally, one of the primary drawbacks of using the cargo area of the vehicles as just described is that, in order to prevent the cargo area from becoming stuffy when resting therein, the windows of the vehicle must likely remain open. However, this invites bugs into the vehicle, making the rest highly unenjoyable. Moreover, when the cargo area is used to store or present food, attracted bugs are particularly troublesome.

Accordingly, the need exists for a device for placing over the opening of the cargo area of vehicles such as sport utility vehicles, vans, minivans, station wagons, and even campers and camper shells on pickup trucks, which, while permitting air to enter the cargo area, prevents bugs and other undesirable things such as for instance leaves or perhaps larger animals, from entering the vehicle. The present invention provides such a device and fills the foregoing and other needs.

SUMMARY OF THE INVENTION

It is an object of the present invention to provide a device for covering the opening of a cargo area of a vehicle.

It is a further object of the present invention to provide a fabric for preventing bugs, and other undesirable things, from entering into the cargo area of the vehicle, although the door to the cargo area is maintained open.

It is a further object of the present invention to provide a mesh-like sheet for covering the opening to the cargo area of a vehicle.

It is still another object of the present invention to provide a sheet-like article for engaging around the periphery of the opening to the cargo area of a vehicle.

It is still a further object of the present invention to provide a sheet-like article for covering the opening of the cargo area to a vehicle, which article may be opened for permitting ingress and egress to and from the vehicle.

It is still another object of the present invention to provide a sheet of material on a roller which, when properly positioned within the cargo area of a vehicle, may be unrolled to cover the opening to the cargo area, and again rolled back up for storage.

These and other objects are achieved by one or more sheets of material dimensioned for covering the opening to the cargo area of a vehicle, such as in a sport utility vehicle, minivan or van, a station wagon, or a camper shell. In one embodiment, a unitary piece of material is substantially dimensioned to cover the cargo area of a vehicle, and to releasibly fasten to the periphery of the opening to the cargo area. The fabric is preferably a closely-spaced mesh made of cloth or one of the many synthetic materials, such as Nylon®, polyester, etc. currently available.

Fastening of the fabric to the vehicle may be accomplished in numerous ways. For instance, zippers, snaps, clasps, adhesives, velcro, and the like may be used. The precise location on the periphery of the cargo area at which the fabric is fastened is not critical. Most, if not all vehicles having a rear cargo area and cargo door have a gasket entirely surrounding the periphery of the opening to the cargo area. This gasket is a rubber or elastomeric strip which serves as a seal when the door is closed. It has been found desirable, and therefore it is preferred, to engage the outer periphery of the fabric about this gasket for engagement with the vehicle. For instance, in an embodiment utilizing velcro, a felt-like strip lines the periphery of the fabric and engages with a strip of closely spaced hooks lining the periphery of the cargo area, preferably on the gasket.

In one highly preferred embodiment, a elastomeric cord, such as a bungee cord, is threaded through a loop in the periphery of the fabric panel and is sized to grasp tautly about the gasket for holding the enclosure in place. In another highly preferred embodiment, a draw string is threaded through a loop in the periphery of the fabric panel. Available ends of the draw string may be pulled to tightly grasp the gasket, and then tied to secure the panel in place. Understandably, in some embodiments, the periphery of the sheet of material is provided with an appropriate fastener for engaging with the fasteners or a mate on the periphery of the opening to the cargo area. In other embodiments, structure of the vehicle is used for engaging the sheet with the vehicle.

In one embodiment, a wide elastic band extends between the fastening means and the mesh for providing a taut arrangement when the sheet is in place, and furthermore, to allow some pressure to be applied to the sheet when in place without it being pulled loose from its engagement with the vehicle.

In one preferred embodiment, the sheet of material is constructed of a mesh-like material, such as is used in the door flap of tents. While air can easily enter the cargo area of the vehicle, bugs and other undesirable things may be kept out. In one embodiment, the sheet may be comprised of two-ply sheets of material, one being mesh-like, and the other being more solid, such as for instance, vinyl. Zippers, Velcro®, or other opening\closing devices may be used around the periphery of the sheet, along an edge thereof, or through its middle to permit the sheet to be opened and closed for ingress and egress to the vehicle, without entirely removing the panel.

Many vehicles having cargo areas have a cargo door having a piston extending between the door and a location at or near the periphery of the opening to the cargo area. Typically, a pair of pistons are utilized, one at each side of the cargo area. In some vehicles, the pistons extend from the cargo door to a location slightly on the interior of the vehicle. When the cargo door is opened, and the pistons extend, the pistons block the outermost plane of the cargo opening periphery. Positioning the fastening means of the present invention inwardly (e.g., towards the cargo area) prevents conflict between the sheet of material and the pistons. However, for fastening the fabric about the outer periphery of the cargo opening, such as at the gasket, slits are provided in the sheet to cooperate with the pistons. In such embodiments, means are provided so that the slits closely engage the pistons to prevent gaps through which bugs, etc. may otherwise easily pass.

In other embodiments of the present invention, the article is made for more permanent installation in the vehicle. In these embodiments, the device is on a roller which is positioned substantially along one peripheral edge of the opening to the cargo area of the vehicle. The sheet may be grasped and unrolled, like a window shade, and placed into a position covering the opening to the cargo area of the vehicle. In such embodiments, the invention may be engaged about the periphery of the opening to the cargo area as described above, or preferably, receiving tracks are provided about at least portions of the periphery of the opening of the cargo area for guiding and engaging the sheet as it is rolled and unrolled. The outer portions of the panel to be rolled and unrolled preferably have a strip of elastic, Spandex, or other highly stretchable material to adapt to contours in the periphery of the opening.

The present invention, although illustrated in the primary embodiments as a fabric device for covering the cargo area to a vehicle, is also useful for covering any opening to the interior of a vehicle. In this regard, it is within the present invention to provide such a fabric and engaging means for engaging the fabric about the periphery of a window of a vehicle.

BRIEF DESCRIPTION OF THE DRAWINGS

The objects and features of the invention noted above are explained in more detail with reference to the drawings, in which like reference numerals denote like elements, and in which:

FIG. 1 is a perspective view of a first embodiment of the present invention;

FIG. 2 is an end elevational view of a first embodiment of the present invention;

FIG. 3 is an end elevational view of a first embodiment of the present invention as modified to adapt to vehicles having a different cargo door piston placement;

FIG. 4 is an enlarged fragmentary view of a portion of the embodiment of FIG. 3;

FIG. 5 is a fragmentary sectional view taken along line 5—5 of FIG. 2 for illustrating preferred manners in which the fabric panel of the present invention engages the vehicle.

FIG. 6 is a fragmentary sectional view like that of FIG. 5, but illustrating a second preferred manner in which the fabric panel engages the vehicle;

FIG. 12 is a fragmentary sectional view taken along line 12—12 in FIG. 8; and

DETAILED DESCRIPTION OF THE INVENTION

Figure 7:
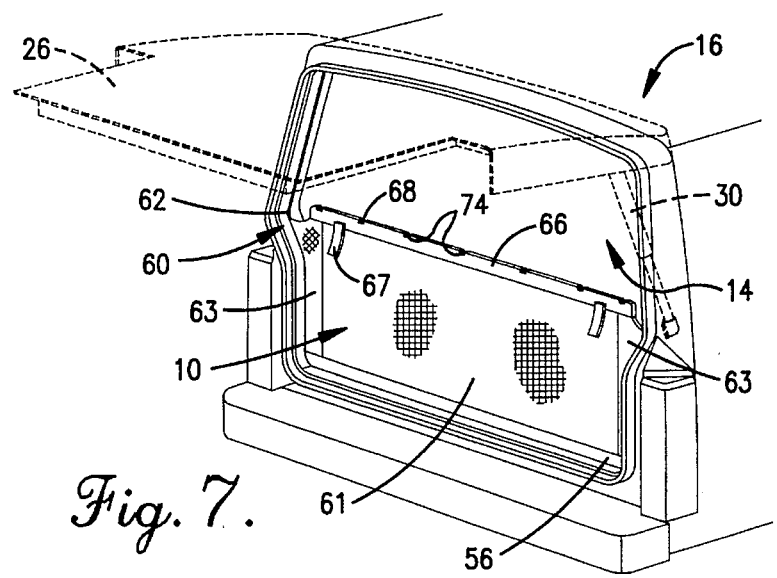
FIG. 7 is a perspective view of a second embodiment of the present invention.

With reference initially to FIG. 1, a panel of the present invention is denoted generally by the reference numeral 10. Panel 10 is generally adapted to cover a vehicular opening, such as a window, door opening, or as shown in FIG. 1, the opening 14 to the cargo area of a vehicle 16.

It will be appreciated that numerous types of vehicles have such covered cargo areas, such as for instance, sport utility vehicles, vans, minivans and station wagons. The device may be constructed for pick-up trucks having a camper shell. As shown in FIG. 1, these vehicles have a flexible gasket 24 surrounding the periphery of the opening 14 to the cargo area. Gasket 24 is typically a rubber gasket for providing a seal with cargo door 26 when door 26 is closed.

Mesh screen 12 of panel 10 of the present invention is preferably constructed of a synthetic such as Nylon or polyester, although any suitable material will suffice, and is such as the material widely used for screen door panels in tents. In the preferred embodiment, screen 12 has a fabric border 18. Fabric border 18 may comprise any suitable, preferably durable material. For instance, fabric border 18 may be cloth, vinyl, or fabric blends. Preferably, fabric border 18 is resiliently flexible (e.g., stretchable and having a memory) such as rubber, elastic, or the material known as Spandex. As discussed and shown more fully below, fabric border 18 is preferably a piece of material which is folded over to engage opposite side surfaces of screen 12 and sewn into place. Although not necessary, it has been found that the sewing operation is enhanced by placing a layer of material (not shown) between the border and one side of sheet 12. Border 18 may be attached to mesh screen in other known manners, such as for instance, with adhesives.

A zipper 20 is provided along the lower edge of panel 10, and particularly at the lower periphery of the visible screen 12. A second zipper 22 is sewn substantially vertically through the center of panel 10. Zippers 20, 22 are sewn into screen 12 in a conventional sewing manner, and permit panel 10 to be opened, like a tent door, to permit ingress to and egress from the vehicle. It will be appreciated that zippers 20, 22 are preferred, but that other means for fastening the opening in panel 10, such as Velcro®, may be utilized. It should also be understood that panel 10 may be constructed without zippers 20, 22 or other fastening means.

With reference now to FIGS. 2–3, panel 10 is shown in position on vehicle 16. As shown, panel 10 is preferably configured with the same general contours of cargo opening 14 of vehicle 16. Panel 10 engages with gasket 24 in one of numerous preferred ways, as described below. In FIGS. 2 and 3, the edge of console 28 is shown. Console 28 is typically a plastic console provided in most, if not all, vehicles of this type. Console 28 is shown in perspective in FIG. 1. Although not shown, other layers of fabric may be sewn to panel 10. For instance, a vinyl cover, having a zipper opening, may be sewn about the periphery 40 of panel 10.

Cargo door 26 has a pair of pistons 30 which extend and retract, respectively, upon opening and closing door 26 by pivoting door 26 at hinges 27. With the doors open as in FIGS. 2 and 3, pistons 30 are extended. It will be appreciated that vehicles having cargo areas are constructed in a variety of manners, and accordingly, the manner in which the cargo door opens and closes similarly varies. For instance, some vehicles utilize one or more cargo doors which are hinged along a side-edge of opening 14 and do not utilize pistons. Many vans have sliding doors on the side. The present invention may be utilized with such vehicles. Many vehicles are constructed in a manner consistent with that shown in FIG. 2, whereby pistons 30 are positioned between door 26 and a location on vehicle 16 which is external to the cargo opening 14, such that panel 10 may be place about gasket 24 without obstruction from pistons 30.

Other vehicles, however, are constructed in a manner as shown in FIG. 3, whereby pistons 20 extend between door 26 and a location at or near console 28 of vehicle 16. Accordingly, panel 10 as shown in FIG. 2 must be modified slightly to accommodate for pistons 30. In the panel 10 as shown in FIG. 3, a slit 32 positioned at each side of panel 10 to receive a respective piston 30.

As shown in FIG. 4, which is a fragmentary view of panel 10 showing one of the slits 32, the slit 32 is preferably positioned within the border 18. A flap 34 having a fastener 35, such as mating Velcro® (e.g., hook and thread) strips, is adapted to position over slit 32 once in place. For clarity, the piston 30 has not been shown in FIG. 4, but it will be understood that piston 30 is positioned through the opening 36 formed by slit 32 and flap 34. Furthermore, it should be understood that flap 34 may take on various shapes, such as for instance, having an arcuate edge so as to mate with the shape of a cylindrical piston. It will be appreciated that other constructions of flap 34 or panel 10 in the area of flap 34 may be utilized to achieve the same purpose.

Numerous means for fastening or engaging panel 10 about the periphery of the opening 14 to the cargo area of vehicle 16 may be utilized and are contemplated. For instance, in one preferred embodiment, the fastener is a draw string threaded through the loop formed by the folded border 18. Preferably, as shown in FIG. 4, the border is sewn along one or more sew lines 38, and the draw string is threaded through the loop formed by the outermost sewline 38. It will be understood that the outermost ends of the drawstring are accessible.

The operation of a draw string should be readily understood, and so is only briefly described. Panel 10 is positioned about the periphery of the opening 14 of the cargo area of vehicle 16, and particularly, the outer peripheral edge 40 of panel 10 is lipped about gasket 24. Such an arrangement is shown in FIG. 5 wherein the drawstring is denoted by the reference numeral 42, and is threaded through a loop formed at substantially the outer peripheral edge 40 of panel. Particularly, gasket 24 has a lip 25 which extends outwardly from a central portion of the gasket and behind which the edge 40 of panel 10 of the present invention is engaged. It will be understood that the outer accessible ends of the draw string (not shown) are pulled to draw, or tighten, the outer peripheral edge 40 of panel 10 about gasket 24. The accessible ends of draw string are tied together to hold panel 10 in place.

With reference again to FIG. 4, a slight variation of panel 10 having a draw string is shown and described. Where panel 10 requires slits 32 to receive the pistons 30 of cargo door 26, a first draw string 44 is positioned about the upper portion of panel 10, and a second draw string 46 is positioned about the lower half of panel 10. First ends of drawstrings 44, 46 are tied together at a first side of vehicle 16 and second ends of drawstrings 44, 46 are tied together at a second side of vehicle 16. As the ends are tied together, the edges of each slit 32 are pulled closely together and are drawn tightly about their respective piston 30. Preferably, knots (not shown) are provided in drawstrings 44, 46 to prevent them from slipping too far into the loop at the periphery 40 of panel 10.

Numerous variations of panel 10 having a drawstring are possible and within the scope of the present invention. For instance, to assist the drawstring in tightly engaging panel 10 entirely about gasket 24, plastic tubes (not shown) which receive the draw string and which follow certain difficult contour areas of the periphery of opening 14 may be sewn into the border to assist the user in properly positioning panel 10 and to guide the drawstring about curves in the contour of the periphery of opening 14. It should be understood that panel 10, although constructed so as to follow the contour of the periphery of opening 14 of vehicle 16, may not precisely follow the contour since it may be drawn or pulled tightly about the opening.

In another preferred embodiment, means for engaging panel 10 about gasket 24 comprise a resiliently flexible cord, such as a rubber cord, threaded through the loop at the outer peripheral edge 40 of panel 10. The rubber cord is looped and is preferably slightly shorter (from one point on the cord, around the loop, and back to that point) than the distance of the periphery of opening 14 of the cargo area of vehicle 16. Accordingly, the cord must be stretched in order for it to completely surround gasket 24. Once in place, the inherent physical memory associated with the rubber band or cord will force it to tightly engage the gasket 24 thereby holding panel 10 in place.

Such an embodiment utilizing a resilient cord is illustrated in FIG. 5 in which the rubber cord is denoted by reference numeral 42 (as specified, reference numeral 42 represents a draw string in another embodiment). It should be appreciated that resiliently flexible cord 42 may be comprised of any suitable resiliently flexible material, such as for instance, rubber, elastic, Spandex, etc.

With reference now to FIG. 6, yet another preferred fastener for engaging panel about the periphery of opening 14 of vehicle 16 is mating strips of a product known commercially as Velcro®. Velcro® is a known fastener which utilizes a first strip 48 of fibrous material, such as felt, and a second strip 50 which is comprised of a plurality of hooks or needles. When placed together, the fibers of the felt become entangled with the needles, which may be barbed, thereby releasibly locking the strips together. As shown in FIG. 6, the fibrous band is preferably attached to the peripheral edge 40 of panel 10, and the hooked strip is attached to vehicle 10. It has been found that, if done the other way, the strip of needles on panel 10 tends to catch and engage with other surfaces, such as carpeting in the bed of vehicle 16. Strip 50 may be attached about gasket 24 in known manners, and is preferably applied thereto with adhesive. Similarly, strip 48 may be applied to panel 10 in known manners. For instance, although sewing is preferred, adhesively attaching strip 48 to panel 10 suffices.

It should be appreciated that border 18 is preferred, but is not necessary. In this regard, a loop for receiving a drawstring or flexible cord may be formed by overlapping the edge of screen 12 to form a loop. When a fastener such as Velcro® is utilized, a loop is not necessary, and the strip 48 may be applied directly to the outer peripheral edge 40 of panel 10, whether or not a border 18 is utilized. Similarly, the fastener may comprise an elastic band (which operates similar to the rubber cord) positioned about the outer edge 40 of panel 10, in which case a loop and\or a border 18 are not necessary.

With reference to FIGS. 5 and 6, border 18 is preferably formed of a resiliently flexible material, such as elastic, Spandex, or the like. Such material provides a taut arrangement of panel 10 when in place and permits some pressure to be applied to panel 10 without it pulling loose from vehicle 16. FIGS. 5 and 6 are partial fragmentary views, having some background portions removed for drawing clarity. Portions of vehicle 16 shown in FIGS. 5 and 6 include a rim 52 located about the periphery of opening 14 to the cargo area of vehicle 16. Rim 52 supports gasket 24. Particularly, gasket 24 is tightly bonded to rim 52. A plastic console 28 is shown. It will be understood that numerous variations of vehicle construction relative to these components are likely to exist and are not critical to the present invention. As cargo door 26 closes, it presses gasket 24 inwardly against wall portion 54 of rim 52 (not shown in Figs. for clarity). When door 26 is in the closed position, panel 10 follows the contour of door 36 and is pressed inwardly, as shown in broken lines, but panel 10 remains in place.

Other fasteners, such as clips, clasps, or adhesive for fastening panel 10 to vehicle 16, for example, are contemplated and within the scope of the present invention. Additionally, although in the preferred embodiment the outer periphery 40 of panel 10 is positioned about gasket 24, other positions for fastening panel 10 to vehicle 16 may be utilized. For instance, one half of a Velcro®-type strip could be positioned about console 24 just interior of the cargo area for engaging with a mating strip on panel 10. Numerous other variations will be readily appreciated.

Panel 10 as shown and described provides a mesh screen which is easily positioned on and removed from vehicle 16. When not in use, panel 10 may be folded into a small package. Panel 10 is highly useful as a tent-like closure for the a vehicle having a cargo area, and is particularly useful for allowing air to enter the vehicle while prohibiting bugs, falling leaves, etc. from entering the vehicle.

With reference now to FIGS. 7–13, a second primary embodiment of the present invention is shown and described. In general, the embodiment of FIGS. 7–13 comprises a rolled panel 10 adapted to unroll and cover the opening 14 to the cargo area of a vehicle 16. The device may be constructed as part of a new vehicle 16 or, alternatively, retrofit onto an existing vehicle.

With reference initially to FIG. 7, vehicle 16 and its various components, such as cargo door 26, pistons 30, gasket 24, and console 28 are as described above. Panel 10 of the present invention is comprised of a roll of material 56 and is positioned substantially at one side edge of the opening 14 to the cargo area of vehicle 16. For clarity, roll 56 is shown positioned on the bed of said vehicle, but it should be understood that roll 56 could be positioned just under bed, covered with a removable or movable plate, and thereby hidden from view when not in use. The ends of roll 56 extend into the peripheral side walls 60 of vehicle 10. Although not shown, it should be understood that roll of material 56 is preferably wound around a rod and operates in a spring-coil fashion, much like a typical window shade.

Roll of material 56 is preferably comprised substantially of a mesh screen 61. Attached at each side of mesh screen 62 in any suitable manner, such as by sewing, is a piece of flexible material or fabric 63, such as elastic, a band of rubber, Spandex, or the like. As described more fully below, the outermost edges of the roll 56, when unrolled, are guided in and engaged in tracks 62 in side walls 60. As the roll of material 56 is unrolled, the flexible material 63 stretches and thereby follows the contour of the periphery of opening 14 to the cargo area of vehicle 16.

Figure 8:
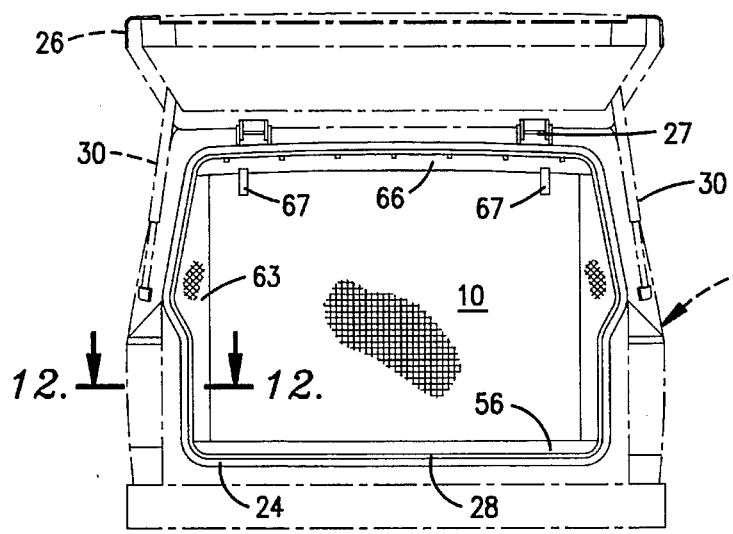
FIG. 8 is an end elevational view of the second embodiment of the present invention.

In FIG. 7, the roll of material 56 is illustrated as it is rolled up or down. In FIG. 8, the roller of material 56 is completely unrolled and entirely covers the opening 14 to the cargo area of vehicle 16.

Figure 9:
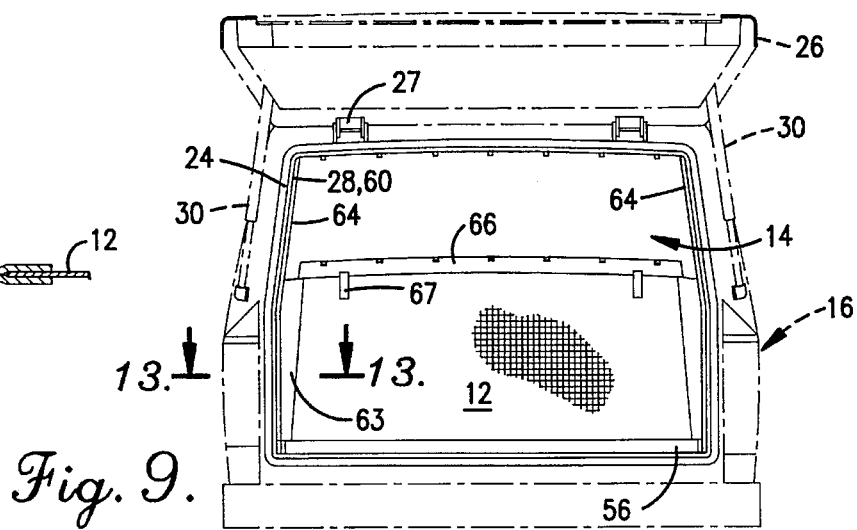
FIG. 9 is an end elevational view of a slight variation of the second embodiment of the present invention.

In FIG. 9, a slight variation is shown. Particularly, in FIG. 9 rail members 64 are positioned on the outside of console 28, such as in a retrofit device. Rail members 64 are preferably comprised of a flexible, but fairly rigid plastic. Additionally, FIG. 9 illustrates a vehicle 16 having a different, less dramatic contour about the periphery to the opening 14. It will be appreciated that different vehicles have different shapes. As shown in FIG. 9, the mesh screen 61 is tapered. Preferably, when tapered in such a manner, the upper corners of the screen 61 will meet substantially with the corner of the opening 14.

Figure 10:
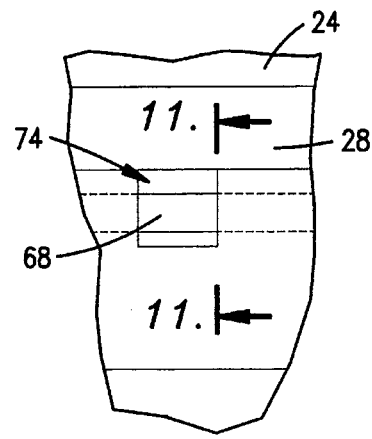
FIG. 10 is an enlarged fragmentary view of preferred components for engaging the second embodiment of the present invention at one edge of the opening to the cargo area of the vehicle.
Figure 11:
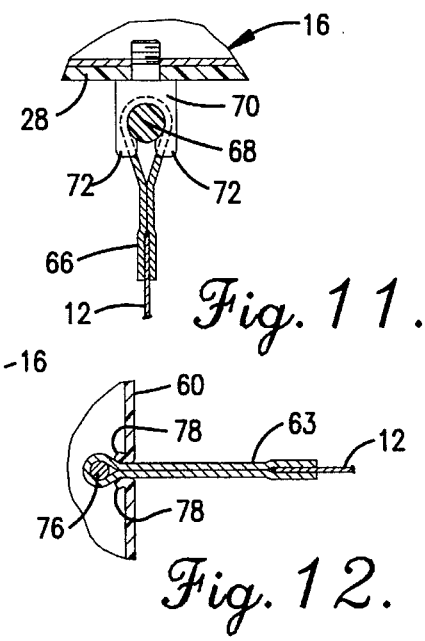
FIG. 11 is a fragmentary sectional view taken along line 11—11 in FIG. 10.

With reference now to FIGS. 10 and 11, the manner in which the panel 10, when unrolled, is preferably fastened to vehicle 16 at the top edge of material 56 is shown and described.

A border 66 is folded over into engagement with opposing side surfaces of material 56 and sewn or otherwise attached into place, thereby forming a loop as shown in FIG. 11. Border 66 may be comprised of any suitable material, such as a natural or synthetic fabric, plastic, or the like. Preferably, border 66 is formed of a durable, stretchable fabric, such as elastic or spandex. It will also be appreciated that mesh fabric 56 could be utilized to form a loop. A rod 68, preferably made of semi-flexible plastic, is positioned through the loop.

A plurality of fastener clips 70, preferably made of plastic, are positioned along the upper edge of opening 14 to the cargo area of vehicle 16. Faster clips 70 may be engaged with vehicle 16 in any suitable manner. As shown, fastener clips 70 are screwed into threaded openings in vehicle 16. Each fastener clip 70 has a pair of ribbed tongs 72. Rod 68 is snapped into, and hence received by, fastener clips 70 and particularly, is held into place by ribbed tongs 72. Further, border 66 preferably has a plurality of spaced apart cut-away portions 74 which reveal rod 68. Cut-away portions 74, one of which is shown best in FIG. 10, are in alignment with the fastener clips 70 such that fastener clips 70 directly engage rod 68 and do not clip fabric. It should be understood that cut-away portions 74 need not be used and that clips 70 could engage about the rod 68 and its covering loop or border 66. For instance, tongs 72 could engage with recessed portions in border 66. Furthermore, it will be appreciated that instead of a number of clips 70, a receiving channel for engaging the entire length of rod 68 could be utilized. Fabric tabs 67 are preferably provided on both the interior and exterior of panel 10 for gripping when rolling and\or unrolling panel 10.

It is noted that rod 68 and border 66 are preferably flexible such that they will easily mate with the contour of the vehicle when fully unrolled. However, rod 70 and/or the upper edge of border 66 may be rigid and constructed initially with the necessary contour.

Figure 13:
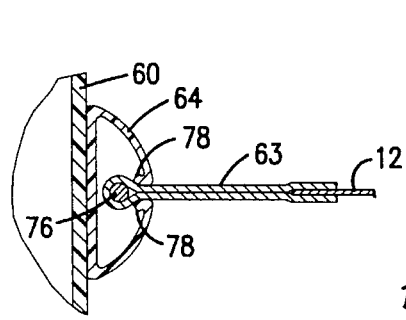
FIG. 13 is a fragmentary sectional view taken along line 13—13 in FIG. 9.

With reference now to FIGS. 12 and 13, the tracks 62 and rail members 64 are respectively shown and described.

In FIG. 12 track members 62 for engaging the fabric 56 comprises a slit with beads 78. The flexible material 63, formed in a loop in a manner now apparent in view of the foregoing, has a highly flexible cord 76 threaded through the loop. Cord 76 is preferably engaged to the interior of the loop. Cord 76, although flexible so that it can roll up, is difficult to compress. Cord 76 may be constructed of any suitable material, such as plastic or rope. Cord 76 prevents the panel 10 from pulling through the slit of track 62. It will be appreciated that the described tracks are provided at each side of the opening 14. Furthermore, although not shown, on vehicles having pistons positioned as in FIG. 3, the tracks run at a location inwardly of the connection point of the piston to prevent the piston from interfering with the panel 10.

With reference now to FIG. 13, rail member 64 is shown in cross-section. Rail member 64 operates on the same principles as track 61, and hence is not be described in detail. Rail member 64 is preferably adhesively bonded to vehicle 16, but may be bolted, screwed, riveted, or otherwise fastened thereto.

In a variation of the that shown in FIGS. 12 and 13, a rigid free-hanging rod, denoted by the reference numeral 76 (previously referenced as a cord) may be fastened at the upper end of vehicle 16 and positioned along the length of track 62 or rail 64. In this way, the outer loop threads onto the rod as the panel 10 is rolled and unrolled. Such an embodiment permits the roll of material 56 to be maintained smaller when rolled because the loops flatten out when out of contact with the rod 76. It will be appreciated that in such an embodiment, a portion of panel 10 must always remain threaded on to the rods 76 at each side of the vehicle to prevent having to re-thread each time.

Other means for engaging and guiding the sides of panel 10 will be recognized. For instance, it is contemplated that a plurality of rollers engage opposing faces of panel 10.

It should be appreciated that the roll of material 56 could be placed along another side edge of the opening 14. For instance, the roll of material 56 could be positioned at either the top or sides of the opening 16, where feasible, depending upon constraints of the vehicle upon which the present invention is utilized. Additionally, it is contemplated that a pair of rolls of material are utilized, with each roll positioned at opposite sides of the opening 14 and adapted to unroll and engage with each other. Although not shown, it should be appreciated and it is contemplated that if roll of material 56 for retrofitting onto a vehicle is placed, for instance, just slightly above the bed of the vehicle due to a contour or curved lower corners of the periphery of opening 14 of vehicle 16, thereby leaving a gap, a flap may be provided to cover the gap.

The invention as described provides a mesh screen adapted for covering the opening 14 to the cargo area of a vehicle. The panel 10 of the present invention is particularly useful for permitting air to enter the vehicle while out keeping bugs, leaves, etc. Panel 10 is easily unrolled into position and rolled for storage. When panel 10 is unrolled, cargo door 26 preferably is permitted to close without interference from panel 10.

From the foregoing it will be seen that this invention is one well adapted to attain all ends and objects hereinabove set forth together with the other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. An article in combination with a vehicle, said vehicle having an opening defined by a periphery having a rim protruding outwardly from a body of said vehicle, said rim for abutting with a door of said vehicle when said door is closed, said combination comprising:

a flexible screen having an outer periphery; and engaging means for releasably engaging said periphery of said flexible screen at least substantially about said outwardly protruding rim of said vehicle, thereby positioning said screen over said vehicle opening.

2. The combination as set forth in claim 1, said article further comprising a flexible panel of non-screen material having an outer periphery attached to said flexible screen proximate said outer periphery of said flexible screen, said panel for covering said screen.

3. The combination as set forth in claim 1, said engaging means comprising a felt and hook fastener, comprised of mateable felt and hook strips, wherein one of said felt strip and said hook strip is positioned about said periphery of said flexible screen and the other of said felt strip and said hook strip is positioned about said protruding rim of said vehicle.

4. The combination as set forth in claim 1, said engaging means comprising a zipper.

5. The combination as set forth in claim 1, said engaging means comprising snaps.

6. The combination as set forth in claim 1, said engaging means comprising an elastic band positioned about the periphery of said flexible screen for engaging about said outwardly protruding rim of said vehicle.

7. The combination as set forth in claim 1, said engaging means comprising a bungee cord positioned about the periphery of said flexible screen for engaging about said outwardly protruding rim of said vehicle.

8. The combination as set forth in claim 1, said engaging means comprising a draw string positioned at said periphery of said screen for holding said screen about said outwardly protruding rim of said vehicle when said draw string is tightly drawn.

9. The combination as set forth in claim 1, wherein said opening is an opening to a cargo area of said vehicle, said vehicle having a cargo door and a piston, said piston extending between said cargo door and a location at the periphery of said opening to said cargo area, wherein said flexible screen has a slit therein for receiving said piston.

10. The combination as set forth in claim 1, wherein said outwardly protruding rim on said vehicle has a lip at an outermost portion thereof, said engaging means engaging about said rim at a surface between said lip and said vehicle body.

11. The article as set forth in claim 10, wherein said outwardly protruding rim is covered with a flexible gasket, said engaging means engaged with said gasket.

12. The combination as set forth in claim 11, further comprising a closeable opening in said flexible screen, thereby permitting ingress to, and egress from, said vehicle through said closeable opening in said screen.

13. A device, in combination with a vehicle having a covered compartment accessible through an opening defined by a periphery having generally upright side-walls said combination comprising:

a flexible panel, adapted to roll and unroll, wherein said panel at least substantially covers said opening to said vehicle when said panel is unrolled; and engaging means, positioned at said side-walls, for engaging side edges of said panel as said panel is rolled and unrolled.

14. The combination as set forth in claim 13, said panel comprising a screen.

15. The combination as set forth in claim 14, wherein said covered compartment of said vehicle is a combined cargo\passenger compartment, and said periphery of said opening to said vehicle has contoured side-walls, and said screen has first and second side-edges comprising a stretchable material that expands and contracts, as said panel is rolled and unrolled, in relation to the contour of said side-walls.

16. The combination as set forth in claim 13, wherein said engaging means comprises receiving tracks, positioned along said side-walls of said vehicle opening, for receiving outer side-edges of said panel as said panel is rolled and unrolled.

17. The combination as set forth in claim 16, said panel having a first flexible cord at a first side thereof and a second flexible cord at a second side thereof, each said cord received by corresponding one of said receiving tracks as said panel is rolled and unrolled.

18. The combination as set forth in claim 13, said engaging means comprising a first rod member, hanging from an upper portion of said vehicle and positioned along a first side-wall of said opening to said vehicle, and a second rod member, hanging from an upper portion of said vehicle and positioned along a second side-wall of said opening to said vehicle, wherein said side-edges of said panel form loops for accepting respective rod members as said sheet is rolled and unrolled.

19. The combination as set forth in claim 13 further comprising at least one fastener, positioned at an upper edge of said vehicle opening, for releasably retaining said panel in an unrolled position covering said vehicle opening.

20. A combination, in combination with a vehicle having an enclosed cargo area, said device for covering an opening to said cargo area of said vehicle, said opening to said cargo area defined by a periphery having angled or contoured side-walls, said device comprising:

a flexible panel, journaled about an axis and adapted to roll and unroll, wherein said panel at least substantially covers said opening to said cargo area when said panel is unrolled; and engaging means, positioned at said side-walls of said cargo opening, for engaging said panel as said panel is rolled and unrolled, wherein said panel further comprises stretchable edges for expanding and contracting, in relation to an angle or contour of said side-walls, as said panel is rolled and unrolled.

* * * * *